Dec. 20, 1960    A. SECOFSKY    2,965,747
PORTABLE PHOTOGRAPHIC LAMP
Filed June 10, 1958    2 Sheets-Sheet 1

INVENTOR.
ABRAHAM SECOFSKY.
BY
*Perey Freeman*
ATTORNEY.

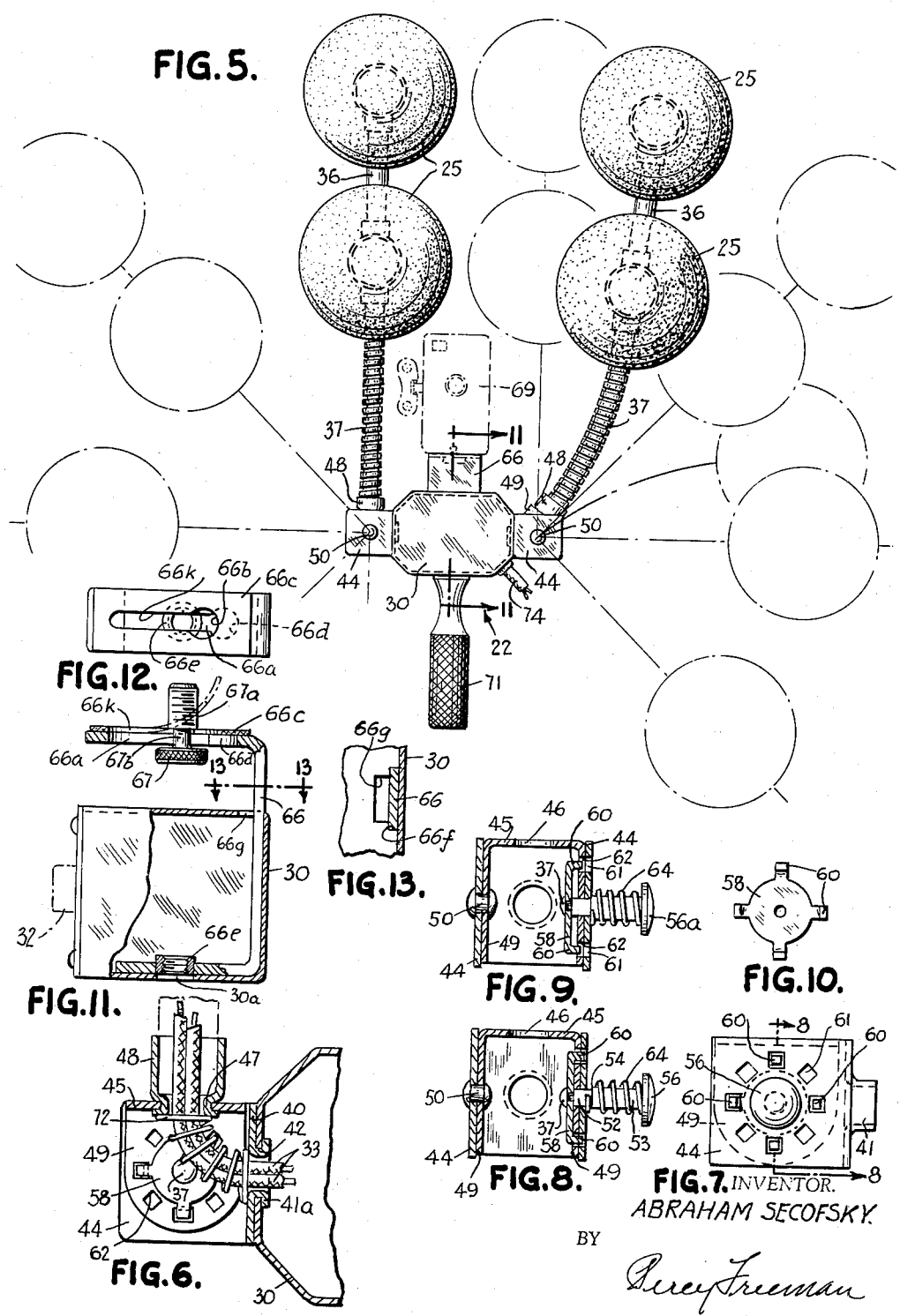

United States Patent Office 2,965,747
Patented Dec. 20, 1960

2,965,747

PORTABLE PHOTOGRAPHIC LAMP

Abraham Secofsky, 10 Lincoln Road, Great Neck, N.Y.

Filed June 10, 1958, Ser. No. 741,032

3 Claims. (Cl. 240—1.3)

This invention relates to photographic equipment and more particularly to a photographic lamp package.

Since the lamps of photographic illuminating equipment are quite fragile, it is necessary to initially pack and later store them in such a manner that will prevent their contact with each other and with adjacent hard elements that might otherwise cause the breakage thereof. Furthermore, while much of home type photographic equipment is ordinarily stored for long periods of time, it has been found to be only not a convenience but also a necessity to provide proper storage facilities for such fragile elements. It is, therefore, an object of the present invention to provide a photographic lamp package in which the equipment may be packed at the time of manufacture and the sale thereof and which may be continuously used after purchase for the storage and transportation of such photographic equipment.

Still another object of the present invention is to provide a photographic lamp package in which all of the lamps are constantly maintained out of contact with each other and which are snugly retained within the container so as to prevent damage thereto at all times.

A further object of the present invention is to provide a photographic lamp package of the above type that includes a container for storing the photographic lamps and main mounting in a completely assembled and operative position so as to enable such equipment to be quickly removed and set up for use at any time.

An additional object of the present invention is to provide a portable photographic lamp unit for illuminating photographic subjects that is conveniently foldable to a collapsed position for storage purposes and which may be selectively adjusted to spread or concentrate the light upon the subject in a simple and efficient manner.

Still another object of the present invention is to provide a portable lamp unit of the type described in which a pair of lamp sets are adjustably supported upon the sides of the control housing for selective movement within a common plane and for movement out of such common plane so as to direct the light emanating from such lamps in any suitable or desired direction.

An additional object of this invention is to provide a portable lamp set having a housing that includes a handle and an adjustable camera mounting for supporting the camera directly above the handle to properly balance the unit in use.

All of the foregoing and still further objects and advantages of this invention will become apparent from a study of the following specification, taken in connection with the accompanying drawing, wherein:

Fig. 5 is a rear elevational view of a lamp set made in accordance with the present invention in operative use.

Fig. 6 is an enlarged fragmentary cross-sectional view taken along line 6—6 of Fig. 3.

Fig. 7 is an enlarged fragmentary rear elevational view of certain parts of the device shown in Fig. 4.

Fig. 8 is a transverse cross-sectional view taken along line 8—8 of Fig. 7 showing the parts locked together.

Fig. 9 is a view similar to Fig. 8 showing the device in an unlocked position for adjustment purposes.

Fig. 10 is a front elevational view of a locking member forming a part of the present invention shown in Figs. 7 to 9.

Fig. 11 is a side elevational view, with parts broken away of a housing and camera mounting forming a part of the present invention.

Fig. 12 is a top plan view of the bracket shown in Fig. 11, with the camera securement screw removed.

Fig. 13 is a fragmentary cross-sectional view taken along line 13—13 of Fig. 11.

Figure 1:
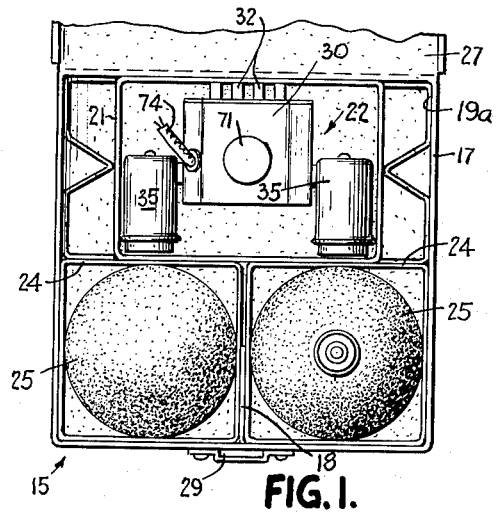
Fig. 1 is a top plan view of a photographic lamp package made in accordance with the present invention in the originally factory packed form.
Figure 2:
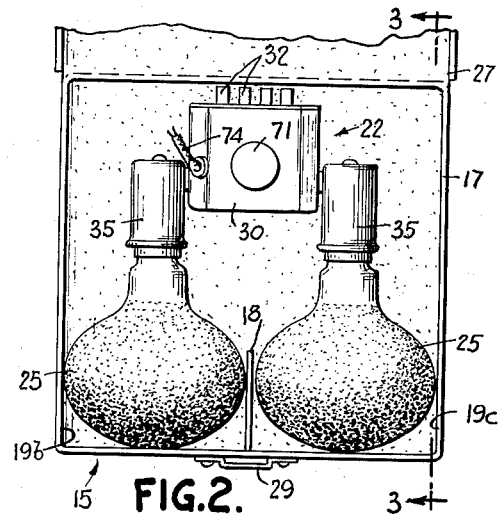
Fig. 2 is a view similar to Fig. 1, showing the package in a normal storage arrangement.
Figure 3:
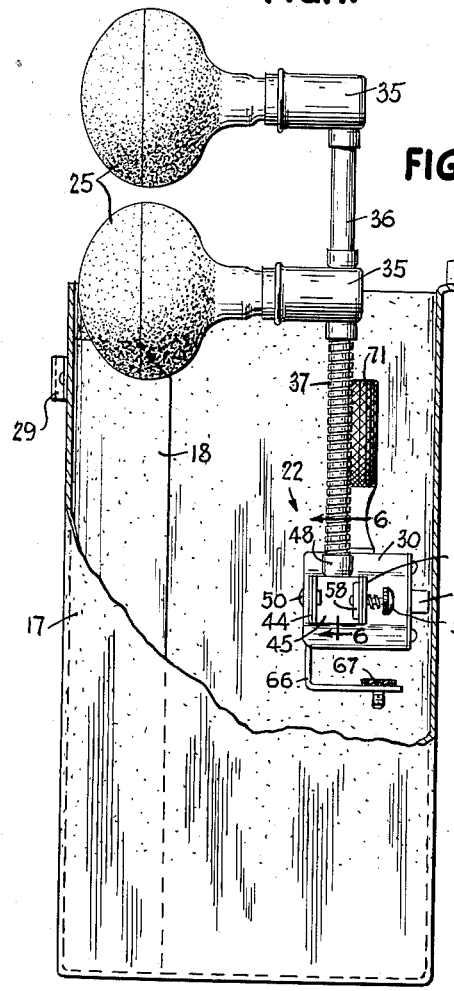
Fig. 3 is a side elevational view, with parts broken away, showing the manner in which the package is assembled for storage as shown in Fig. 2.
Figure 4:
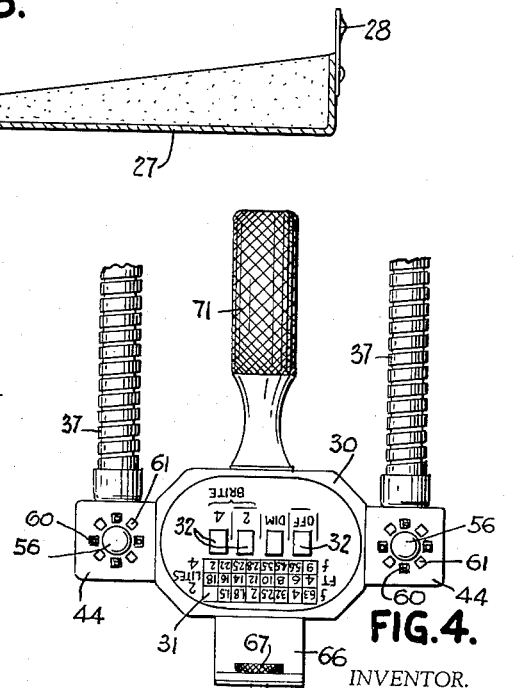
Fig. 4 is an enlarged fragmentary rear elevational view of certain parts of the lamp set shown in Fig. 3.

Referring now to the drawing, and more particularly to Figs. 1 to 3 thereof, a photographic lamp package 15 made in accordance with the present invention is shown to include a container 17 having side walls of any suitable construction and having a permanent partition member 18 extending inwardly from one side thereof in spaced relationship with an opposite side thereof. This permanent partition member 18 divides the interior of the container generally into three storage areas 19a, b, c, which receive the respective parts of a photographic lamp unit 22.

When initially packed at the factory, the main lamp assembly 22 is first placed within an envelope or sleeve 21 and then deposited within one of the storage areas 19a in the container. The individual lamps 25 are then placed within separate envelopes or tubes 24 and then placed within the other storage areas 19b, c, on opposite sides of the partition member 18 so as to insulate them as much as possible from each other and from the other parts of the package so as to virtually insulate them against breakage. A closure lid 27 is hingedly connected to one of the side walls of the container 17 and is selectively movable between an open and a closed position by means of a snap closure element 28 connected thereto and engageable within a bail or other retaining means 29 on the opposite side of the container.

When the parts of the package are first removed for use, the lamps 25 are inserted into the sockets 35 of the lamp unit and the envelopes 21, 24 may be discarded. Thereafter, it is only necessary to slide the assembly into the container in the manner shown in Figs. 2 and 3, whereby the permanent partition 18 will maintain the adjacent lamps 25 out of contact with each other. As a result, it is possible to quickly remove the lamp assembly for use without having to first assemble it and then return it to the storage position without having to dismantle it.

With reference now to Figs. 4 through 10 of the drawing, the lamp assembly 22 is shown to further include a main control unit having a housing 30 upon the back side of which an exposure guide 31 and push button control switches 32 are disposed. Electrical supply wires 33 extend through the housing 30 and are connected to individual lamp sockets 35 in a manner hereinafter more fully described.

The lamp unit includes two sets of lamps, one such set being disposed on each side of the housing 30. Each such set of lamps includes a pair of lamp sockets 35 that are connected together by means of a short length of hollow tubing 36, and each such pair of sockets 35 and connecting tubing 36 are connected by means of a hollow flexible tubular member 37 to bracket assemblies carried upon the side of the housing 30. As is more clearly shown in Figs. 6 through 9 of the drawing, each bracket assembly includes a U-shaped member having a base 40 that has an outwardly struck tubular section 41 that is peened over to form a flange 41a, as shown in Fig. 6, that securely engages the opening defining portions of an aperture 42 in the side of the housing 30. A similar but slightly smaller U-shaped member having a base 45 and arcuate side walls 49 is slidably disposed between the sides 44 of the first mentioned U-shaped member. This smaller U-shaped member base 45 is also provided with an opening 46 that receives the flange 47 of a coupling member 48 which is attached to the respective flexible arm 37. This flange 47 is also peened over so as to be securely attached to the U-shaped plate. One of the arcuate sides 49 of a smaller U-shaped plate is pivotally attached to the adjacent side 44 of the larger U-shaped plate, while the opposite sides 49, 44 of both U-shaped plates are provided with a plurality of openings 61, 62 that are movable into and out of alignment with each other. A pin 53 having a reduced section 52 that rotatably supports the apertured sides of the U-shaped plates is supported thereon for limited axial movement, which movement is limited in one direction by the shoulder 54 formed between the larger and smaller portions of the pin 53. The outer end of the pin is provided with a push button 56 for purposes hereinafter described, while the inner end of the pin is provided with a fastener 57 that secures a control plate 58 thereto.

The control plate 58 has a plurality of perpendicularly related detents 60 that are movable into and out of engagement with the respective openings 61, 62 in the side members 44, 49. A compression spring 64 encircling the pin 53 and acting against the push button 56 normally retains the detents 60 of the plate 58 in engagement with the openings 61, 62 of the sides of the U-shaped plates, thus preventing rotation therebetween. However, by depressing the pushbutton 56 to the release position 56a illustrated in Fig. 9, the lugs or detents 60 are retracted out of engagement with the opening 61 in the outermost side 44 of the U-shaped plate, thus permitting the smaller U-shaped plate to be rotated relative to the larger U-shaped plate. After the arms that support the sockets and lamps have been so rotated to any one of the adjusted positions illustrated in broken lines in Fig. 5 of the drawing, the push button 56a may be released so that the spring 64 will retract the control plate 58 and urge the detents 60 into engagement with the openings in the sides of the U-shaped members.

The upper side of the housing 30 is provided with a bracket 66 and attachment screw 67 for supporting a camera 69 thereon. The lower end of the housing is provided with a removable rigid handle 71 for holding the entire unit during use. The electrical supply line 74 enters one side of the housing 30 and is connected to the push button switches 32. Additional leads 33 are then fed through the tubular arms 36, 37 and directed through the brackets by spring-type guides 72 so that they do not become snagged or otherwise interfere with the proper adjustment of the arms.

Reference is now made to Figs. 11 to 13 of the drawing, which more clearly illustrates the camera mounting forming another part of the present invention. The top wall of the main housing 30 is shown to include a central slot 66f that slidably receives the bracket 66 during the assembly of the unit. A slightly smaller cutout 66g communicates centrally with this slot 66f to accommodate the movement of an internally threaded bushing 66e that is attached to the bracket 66 during this assembly, following which the bracket is spot-welded or otherwise secured within the housing. It will be noted that the bushing 66e overlies an opening 30a in the bottom of the housing so as to threadedly engage with a threaded stud on the handle 71.

The upper arm of the bracket 66 has a longitudinal slot 66a that terminates at one end with an enlarged hole 66d that accommodates the insertion of the enlarged threaded stud portion 67a of a thumb screw 67. This thumb screw has a reduced diameter neck portion 67b that is slidably received within the slot 66a. A flexible cushion pad 66c, having an adhesive backing for attachment to the uppermost surface of the bracket, is also provided with a longitudinal slot 66k and an enlarged opening 66b at one end for receiving the enlarged threaded stud 67a of the thumb screw during the initial assembly operation. However, to prevent the thumb screw from being disassembled from the bracket, the enlarged opening 66b in the pad is displaced from alignment with the enlarged opening 66d of the bracket. Thus, during the initial assembly of the article, the thumb screw is first inserted into the enlarged bracket hole 66d, moved partially along the length of the slot 66a, following which the pad 66c is applied and the stud 67a inserted into the enlarged pad opening 66b. The pad is then securely attached to the bracket in the position shown in Fig. 12, whereby a part of it overlies and blocks the enlarged opening 66d of the bracket, thus preventing disassembly of the thumb screw.

In actual use, the handle is attached to the bushing 66e of the bracket and the camera is attached to the thumb screw 67. Before completely tightening the thumb screw, however, the camera is moved along the bracket to dispose the center of gravity thereof as closely as possible over the handle 71 to provide a proper balance of weight.

In order to conserve space, the lamp sets are folded downwardly toward the handle side of the main housing before insertion into the container 17. In this way, the handle 71 is disposed between the arms in the storage position and the camera bracket end of the housing is first inserted into the container, as shown in Fig. 3. When the arms are in the use position, the flexible tubing 37 permits the lamps to be moved in and out of the plane of rotation thereof toward and away from the subject being photographed. Thus, through the combined cooperation of the adjustable brackets which secure the arms to the side of the housing and the flexible tubing 37, the lamps may be adjusted in three directions so as to properly direct the light upon the subject. The switches 32 provide means for adjusting the intensity of the lamp, whereby complete control over the lamps may be had at all times.

While this invention has been described with particular reference to the construction shown in the drawing, it is to be understood that such is not to be construed as imparting limitations upon the invention, which is best defined by the claims appended hereto.

Having thus described my invention, what I claim as new and desire to secure by Letters Patent, is:

1. A portable lamp unit for illuminating photographic subjects comprising in combination a main control housing, a plurality of lamp sets and brackets adjustably supporting said lamp sets individually upon spaced apart portions of said main control housing for rotating movement in a common plane, each said bracket comprising a laterally outwardly open U-shaped member having a base secured to a side of said housing, a similar but slightly smaller U-shaped member having a base connected to one of said lamp sets and having arcuate side walls slidably and rotatably disposed between the side walls of the first mentioned U-shaped member and pivoted thereto, one adjacent side of each said interfitting U-shaped members having a plurality of similar, spaced apart openings extending therethrough for selective alignment angularly with respect to each other and detent means limiting relative rotation between said interfitting U-shaped members.

2. A portable lamp unit as set forth in claim 1 wherein said detent means comprises a plate having lugs supported adjacent to said one side of said U-shaped members for selective movement toward and away therefrom, said lugs being engageable within said aligned openings during said movement toward said one side, a spring biasing said plate and lugs toward said engagement within said openings and means for overcoming said spring to disengage said lugs for effecting angular adjustment between said U-shaped members.

3. A portable lamp unit as set forth in claim 2, including an additional adjustment means for independently effecting movement of each of said lamp sets out of said common plane.

References Cited in the file of this patent

UNITED STATES PATENTS

| | | |
|---|---|---|
| 2,487,528 | Dawson | Nov. 8, 1949 |
| 2,530,912 | Secofsky et al. | Nov. 21, 1950 |
| 2,532,075 | Powell | Nov. 28, 1950 |
| 2,535,372 | Schaeffer et al. | Dec. 26, 1950 |
| 2,551,753 | McCullough | May 8, 1951 |
| 2,555,871 | Caggiano | June 5, 1951 |
| 2,560,200 | Werzyn | July 10, 1951 |
| 2,697,776 | Wale | Dec. 21, 1954 |
| 2,806,416 | Jones | Sept. 17, 1957 |
| 2,826,978 | Klaeden | Mar. 18, 1958 |
| 2,843,257 | Collins | July 15, 1958 |